United States Patent
Leiter et al.

(10) Patent No.: US 12,529,403 B2
(45) Date of Patent: Jan. 20, 2026

(54) BRAKE SYSTEM FOR A VEHICLE

(71) Applicant: HL MANDO CORPORATION, Pyeongtaek-si (KR)

(72) Inventors: Ralf Leiter, Mendig (DE); Lothar Wagner, Simmern (DE); Sergej Hoffmann, Oberursel (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 244 days.

(21) Appl. No.: 17/742,830

(22) Filed: May 12, 2022

(65) Prior Publication Data
US 2022/0389981 A1 Dec. 8, 2022

(30) Foreign Application Priority Data
Jun. 8, 2021 (DE) .................... 10 2021 205 743.8

(51) Int. Cl.
| | | |
|---|---|---|
| *F16D 65/18* | (2006.01) | |
| *F16D 65/00* | (2006.01) | |
| *F16D 121/24* | (2012.01) | |
| *F16D 125/40* | (2012.01) | |

(52) U.S. Cl.
CPC .......... *F16D 65/18* (2013.01); *F16D 2121/24* (2013.01); *F16D 2125/40* (2013.01)

(58) Field of Classification Search
CPC ................................................. F16D 2125/08
See application file for complete search history.

(56) References Cited

U.S. PATENT DOCUMENTS

| | | | | |
|---|---|---|---|---|
| 5,545,842 A | * | 8/1996 | Balsells ............... | H05K 9/0016 |
| | | | | 285/318 |
| 2017/0089462 A1 | * | 3/2017 | Allen ..................... | B60T 1/062 |
| | | (Continued) | | |

FOREIGN PATENT DOCUMENTS

| | | | | |
|---|---|---|---|---|
| CN | 103661315 A | * | 3/2014 | ........... F16D 5/0075 |
| DE | 10 2008 037 720 A1 | | 2/2010 | |
| DE | 102010033255 A1 | | 2/2012 | |
| | (Continued) | | | |

OTHER PUBLICATIONS

Office Action issued in corresponding German Patent Application No. 10 2021 205 743.8, dated Mar. 11, 2022.
Office Action From Korean Patent Office, Dated Aug. 20, 2025.

*Primary Examiner* — Melody M Burch
(74) *Attorney, Agent, or Firm* — Harvest IP Law, LLP

(57) ABSTRACT

The application relates to a brake system for a vehicle, comprising a brake piston connectable to a brake pad and configured for performing a braking motion to press the brake pad against a friction surface, a hydraulic brake unit configured for hydraulic actuation of the braking motion, an electro-mechanical parking brake actuator configured for actuating the braking motion comprising a spindle rotatable by an electric motor, and a nut such that a rotational motion of the spindle leads to a translational motion of the nut, wherein the nut is coupled with the brake piston such that a translational motion of the nut toward the brake piston actuates the braking motion of the brake piston, wherein the brake system further comprises an elastic member coupling the brake piston with the nut, configured to drive a motion of the brake piston in a direction opposite the direction of the braking motion.

12 Claims, 14 Drawing Sheets

(56) References Cited

U.S. PATENT DOCUMENTS

2018/0298969 A1    10/2018   Demorais et al.
2019/0256072 A1*   8/2019   Hyeon .................... F16D 65/18

FOREIGN PATENT DOCUMENTS

| DE | 102018213850 A | * | 2/2020 | |
| GB | 2279124 A | * | 12/1994 | ............ B60T 13/745 |
| JP | 2007100742 A | * | 4/2007 | |

* cited by examiner

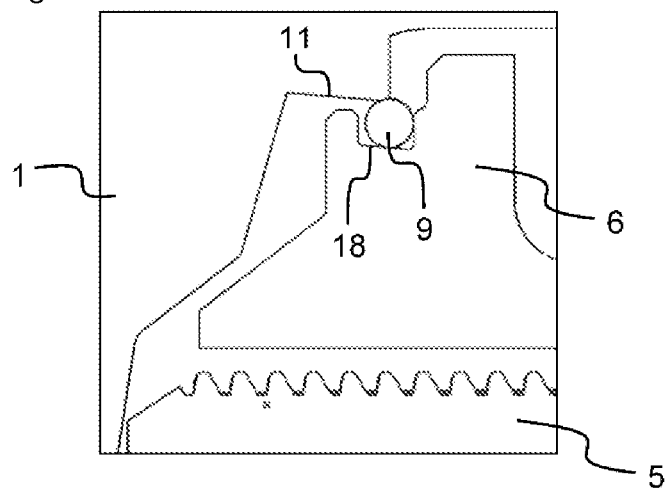

BRAKE SYSTEM FOR A VEHICLE

TECHNICAL FIELD

The application relates to a brake system for a vehicle.

BACKGROUND ART

Brake systems for vehicles are known. Generally, a vehicle may be equipped with a hydraulic brake, which uses brake fluid to transfer pressure from a master cylinder to wheel brakes. The master cylinder may be connected to a brake pedal via a push rod. The wheel brakes may comprise brake calipers connected to the master cylinder via hydraulic lines. The wheel brakes may comprise caliper pistons and brake pads connected to the caliper pistons. Upon actuation of the brake pedal, the brake pads may be pushed against a brake disk to slow or stop the vehicle. Further, vehicles may be equipped with an electronic parking brake to keep the vehicle securely motionless when parked. Typically, the driver activates the electronic parking brake with a button and the brake pads are electrically applied to the wheels. In some vehicles, the electronic parking brake uses a computer-controlled motor, which may be attached to each of the two rear brake calipers in a motor on caliper system, for example.

SUMMARY

In view of the above-mentioned aspects, it is an object of the present invention to provide an improved brake system for a vehicle. In particular, it is an object of the application to provide a brake system which is compact and robust and which ensures reliable actuation and release of both a hydraulic and a parking brake system.

This objective is achieved by a brake system for a vehicle comprising the features of claim 1. Optional further features and further developments will become apparent from the dependent claims and the detailed description in conjunction with the accompanying figures.

The proposed brake system for a vehicle comprises a brake piston connectable to a brake pad. The brake piston is configured for performing a braking motion to press the brake pad against a friction surface. Typically, the braking motion is a linear motion. The braking motion of the brake piston is typically directed toward the friction surface. The friction surface typically rotates when vehicle is in motion. The friction surface may be coupled with a wheel of the vehicle. The friction surface is typically a surface of a brake disk. The brake disk may in some embodiments be regarded as a part of the claimed brake system. The brake system may comprise a hydraulic brake and a parking brake.

The proposed brake system further comprises a hydraulic brake unit, which may form a part of the hydraulic brake. The hydraulic brake unit is configured for hydraulic actuation of the braking motion of the brake piston. The hydraulic brake unit may be or form a part of the hydraulic brake, which may be a service brake or a driving brake. The hydraulic brake unit may be configured to slow down and/or to stop the vehicle. The hydraulic brake system usually uses a brake fluid, e.g., containing glycol ethers or diethylene glycol, for the hydraulic actuation of the braking motion of the brake piston. The hydraulic brake unit may comprise a master cylinder. The master cylinder may be coupled with the brake pedal, e.g., via a push rod. The master cylinder may be in hydraulic communication with the brake piston for the hydraulic actuation of the braking motion of the brake piston. A hydraulic chamber which may be pressurized to actuate the braking motion of the brake piston may be arranged behind the brake piston and/or enclosed within the brake piston.

The brake system further comprises an electro-mechanical parking brake actuator, which may form a part of a parking brake. The electro-mechanical parking brake actuator is configured for actuating the braking motion of the brake piston. The electro-mechanical parking brake actuator may be configured to keep the vehicle motionless when parked. According to the proposed brake system, a combined parking brake and hydraulic brake may be provided. Typically, the parking brake and the hydraulic brake both make use of the same brake piston for performing the braking motion. The electro-mechanical parking brake actuator comprises a spindle. The spindle is rotatable by an electric motor. In typical embodiments, the spindle is rotatable around a longitudinal axis of the spindle. The longitudinal axis of the spindle typically points to the brake pad and/or the brake disk. The spindle may be translationally fixed. The brake system may comprise a housing, e.g., a caliper housing. The spindle may be translationally fixed with respect to the housing.

The electro-mechanical parking brake actuator further comprises a nut received on the spindle. The nut is received on the spindle such that a rotational motion of the spindle leads to a translational motion of the nut. The translational motion of the nut may be a motion in a direction along the longitudinal axis of the spindle. In typical embodiments, the translational motion of the nut may occur toward the friction surface and/or away from the electric motor. In some embodiments, the nut comprises splines on an inner surface. The spindle may comprise corresponding splines on an outer surface. The splines of the spindle may be in engagement with the splines of the nut. In other embodiments, however, the spindle may form a ball screw such that the spindle is coupled to the nut via a set of balls. In most embodiments, the nut is rotationally fixed with respect to brake piston and/or with respect to the housing.

The nut is coupled with the brake piston such that a translational motion of the nut toward the brake piston actuates the braking motion of the brake piston. The nut typically comprises a surface, e.g., a front surface, facing the brake pad. To actuate the braking motion of the brake piston, the surface of the nut may push against the piston according to most embodiments.

The brake system further comprises an elastic member. The elastic member couples the brake piston with the nut. The elastic member is configured to drive a motion of the brake piston in a direction opposite the direction of the braking motion of the brake piston, e.g., in a direction away from the brake pad. According to some embodiments, the elastic member is configured to push or configured to pull the brake piston in a direction opposite the direction of the braking motion of the brake piston. The brake piston may be movable with respect to the nut to allow for the braking motion upon hydraulic actuation. When the brake piston performs the braking motion upon hydraulic actuation, the nut may be motionless. The elastic member may allow the brake piston to move forward with respect to the nut when the hydraulic brake unit actuates the braking motion of the brake piston.

Due to the elastic member, the retraction of the brake piston may be supported when the parking brake is not fully actuated. Thereby, the proposed brake system constitutes a compact, robust and reliable system that reduces residual torque application of the brake, i.e., upon release of the hydraulic brake and/or upon release of the parking brake. This can be particularly advantageous when a brake piston sealing member, which may be provided, and/or pad springs, which may be provided, are not able to reliably retract the piston on their own. For example, an active retraction of the brake piston may be achieved by the elastic member.

In typical embodiments, the elastic member is configured to drive the motion of the brake piston such that the brake piston is retracted upon movement of the nut in a direction opposite the braking motion of the brake piston. In this manner, a retraction of the brake piston may be achieved upon release of the parking brake.

Typically, the elastic member is configured to drive the motion of the brake piston such that the brake piston is retracted upon release of the hydraulic actuation of the braking motion of the brake piston. The elastic member may be configured to push or pull the brake piston such that it is retracted upon release of the hydraulic actuation, e.g., after a pressure in the hydraulic chamber is released. In some embodiments, the motion of the brake piston is driven by an elastic force stored in the elastic member.

The elastic member may be in direct contact with both the brake piston and the nut. In typical embodiments, the elastic member is fixed to the nut. In particular, the elastic member may be fixed to the nut such that its motion with respect to the nut is restricted in a longitudinal direction. The brake piston may be movable with respect to the elastic member. In some embodiments, the elastic member is arranged on a surface of the nut that faces away from the spindle axis, which may be a side surface of the nut. Further, the elastic member may contact an inner surface of the brake piston. The inner surface of brake piston may be a surface that faces the spindle axis. In other embodiments, the elastic member is fixed to the brake piston. In particular, the elastic member may be fixed to the brake piston such that its motion with respect to the brake piston is restricted in the longitudinal direction. The nut may be movable with respect to the elastic member. In some embodiments, the elastic member is arranged on a surface of the brake piston that faces toward the spindle axis, which may be an inner of the nut. Further, the elastic member may contact an outer surface of the nut. The outer surface of the nut may be a surface that faces away from the spindle axis.

In some embodiments, the elastic member contacts an inclined surface. The inclined surface may be an inclined inner surface of the brake piston and/or an inclined outer surface of the nut. The inclined surface is typically a surface which is conical and/or not cylindrical. The inclined surface may be tapered in a direction away from the brake pad and/or toward the electric motor. The inclined surface may be inclined such that a force exerted by the elastic member on the inclined surface of the brake piston drives the brake piston in a direction opposite the direction of the braking motion of the piston. In this manner, the inclined surface may enable or improve retraction of the brake piston after the hydraulic brake and/or the parking brake is released.

In some embodiments, the brake system comprises a groove. The groove may be formed in the brake piston, in particular in an inner surface of the brake piston, or in the nut, in particular in an outer surface of the nut. The elastic member may be received within the groove. The elastic member may be slidably received within the groove, in particular such that the elastic member can slide in the longitudinal direction. The groove may have a bottom surface. The bottom surface may be in contact with the elastic member. The bottom surface may be inclined. The bottom surface may be conical and/or not cylindrical. The bottom surface may be tapered in a direction away from the brake pad and/or toward the electric motor. In some embodiments, the elastic member is held between the bottom surface and the inclined surface. The bottom surface of the groove may be shaped such that the elastic member may is received deeper within the groove when the elastic member is arranged in a portion of the groove that is spaced further from the brake pad and/or that is closer to the electric motor. Correspondingly, the bottom surface of the groove may be shaped such that the elastic member is received less deep within the groove when the elastic member is arranged in a portion of the groove that is closer to the brake pad and/or further away from to the electric motor. By providing the inclined bottom surface of the groove, it is ensured that the elastic member exerts only a reduced resistance or no resistance at all to the retracting motion of the brake piston after release of the hydraulic actuation of the brake. In this situation, the elastic member may be pushed down the bottom surface into the portion of the groove that is spaced further from the brake pad and/or that is closer to the electric motor. Further, the support of the retraction of the brake piston by retraction of the nut may be improved by the inclined bottom surface of the groove. In this situation, the elastic member may be pushed up the bottom surface into the portion of the groove that is closer to the brake pad and/or further away from to the electric motor. In this manner, a resistance exerted by the elastic member to the retracting motion of the brake piston may be efficiently reduced.

In some embodiments, the elastic member comprises a spring-loaded ball that is configured to be held by a recess. The recess may be formed on an inner surface of the brake piston. In other embodiments, the recess may be formed in the nut. The recess and the spring-loaded ball may form a ball detent. The ball detent may be configured such that it drives a motion of the brake piston in the direction opposite the direction of the braking motion of the brake piston to achieve the retraction of the brake piston after the hydraulic brake and/or the parking brake is released. The retraction of the brake piston may be achieved by the spring-loaded ball being pulled toward the recess or toward a portion of the recess. The spring-loaded ball may be a metal sphere. The spring-loaded ball may be received within a cylindrical recess, e.g, bored cylinder. The cylindrical recess may be arranged within the nut. The cylindrical recess may be formed as a through hole in the nut. In this way, evacuation of air bubbles and/or pressure compensation of brake fluid may be improved. A spring may be received within the cylindrical recess such that it pushes the spring-loaded ball outward. In some embodiments, the cylindrical recess is arranged within the brake piston. The elastic member may comprise multiple spring-loaded balls with the features as described above.

In typical embodiments, the elastic member is configured to decouple the nut from the brake piston upon retraction of the nut beyond a decoupling point. The decoupling point may be formed by an edge. The edge may be formed by an inner surface of the brake piston or by an outer surface of the nut. The brake system may be configured such that the nut decouples from the brake piston when the nut is retracted further than at least 1 mm and/or further than at most 10 mm, e.g., as measured with respect to a position in which the nut is coupled with the brake piston such that the translational motion of the nut toward the brake piston would actuate the braking motion of the brake piston. The decoupling point enables convenient exchange of the brake pad and/or calibration operation of the nut. The brake system is typically configured such that the nut and the brake piston re-couple upon a subsequent actuation of the electro-mechanical parking brake actuator.

In typical embodiments, the nut comprises an end portion in a region closest to the brake pad. The elastic member may be arranged in the end portion of the nut. The nut may further comprise a rotation prevention member. The rotation prevention member may provide a rotational fixation of the nut with respect to the brake piston. For example, the rotation prevention member may be formed by a ridge of the nut. The rotation prevention member may engage with a portion of the brake piston to prevent rotation of the nut. Typically, the end portion and/or the elastic member is arranged closer to the brake pad and/or further from the electric motor than the rotation prevention member of the nut.

The elastic member is typically either fully or at least in parts made of an elastic material. The elastic member may be made of or contain an elastomer. In other embodiments, the elastic member is made of or contains a metal. In most embodiments, the elastic member is ring-shaped. The elastic member may be a spring ring. For example, the elastic member may be an elastomeric ring, e.g., a rubber ring. In other embodiments, the elastic member is a metallic spring ring. To enable particularly reliable operation, the elastic member may be a multi-spring ring, e.g., a metallic multi-spring ring. The multi-spring ring may comprise multiple leaf spring members, e.g., at least 4 leaf spring members arranged around a circumference of the multi-spring ring. The elastic member may be a ring with a circular cross section or a ring with a quadratic cross section.

In typical embodiments, the elastic member enables fluid to pass, in particular in the longitudinal direction. In this way, evacuation of air bubbles and/or pressure compensation of brake fluid may be achieved. Therefore, in some embodiments, the elastic member does not form a fully closed annular seal between the nut and the brake piston. The elastic member may be formed by a slotted ring.

A diameter of the elastic member is typically at least 10 mm and/or at most 50 mm. A width of the elastic member, as measured in the longitudinal direction, may be at least 1 mm and/or at most 10 mm. A height or thickness of the elastic member, as measured in a radial direction may be at least 0.5 mm and/or at most 2 mm.

Further, the brake piston sealing member may be provided. The brake piston sealing member may be a sealing ring. The brake piston sealing member may be arranged between an outer surface of the brake piston and an inner surface of the housing. The brake piston sealing member may be provided to hydraulically seal the hydraulic chamber containing the brake fluid from an outside of the brake system. The sealing member may prevent rotation of the brake piston. In some embodiments, the brake system sealing member is deformable and contributes to the retraction of the brake piston to some extent. The elastic member may support a sealing ring retraction, in particular upon release of the hydraulic brake, in some embodiments.

The brake system may comprise a brake caliper. The brake piston may be a part of the brake caliper and may be a caliper piston. The brake caliper may comprise another brake piston having technical features that correspond to the features of the brake piston. The other brake piston may be connectable to another brake pad. The other brake piston may be configured for performing a braking motion to press the other brake pad against another friction surface. The other friction surface may be a surface of the brake disk. The other friction surface may be arranged on an opposite side of the brake disk as compared with the friction surface. The electro-mechanical parking brake actuator may be coupled with an electronic control unit configured to actuate the electro-mechanical parking brake actuator. The electro-mechanical parking brake actuator may comprise the electric motor configured to rotate the spindle of the electro-mechanical parking brake actuator or may be coupled with the electric motor. The electronic control unit may be configured to automatically move the nut a forward after release of the parking brake may an amount that is less the amount required for the braking motion of the parking brake. In some embodiments, the electric motor or the electronic control unit is coupled with a button. Further, in some embodiments, a driver of the vehicle may activate the electro-mechanical parking brake using the button. The electric motor configured to rotate the spindle of the electro-mechanical parking brake actuator may be attached to the brake caliper in some embodiments.

BRIEF DESCRIPTION OF THE DRAWINGS

Exemplary embodiments will be described in conjunction with the following figures.

FIGS. 7a to 7d show a detailed view of the brake system.

DETAILED DESCRIPTION OF EMBODIMENTS

Figure 1A:
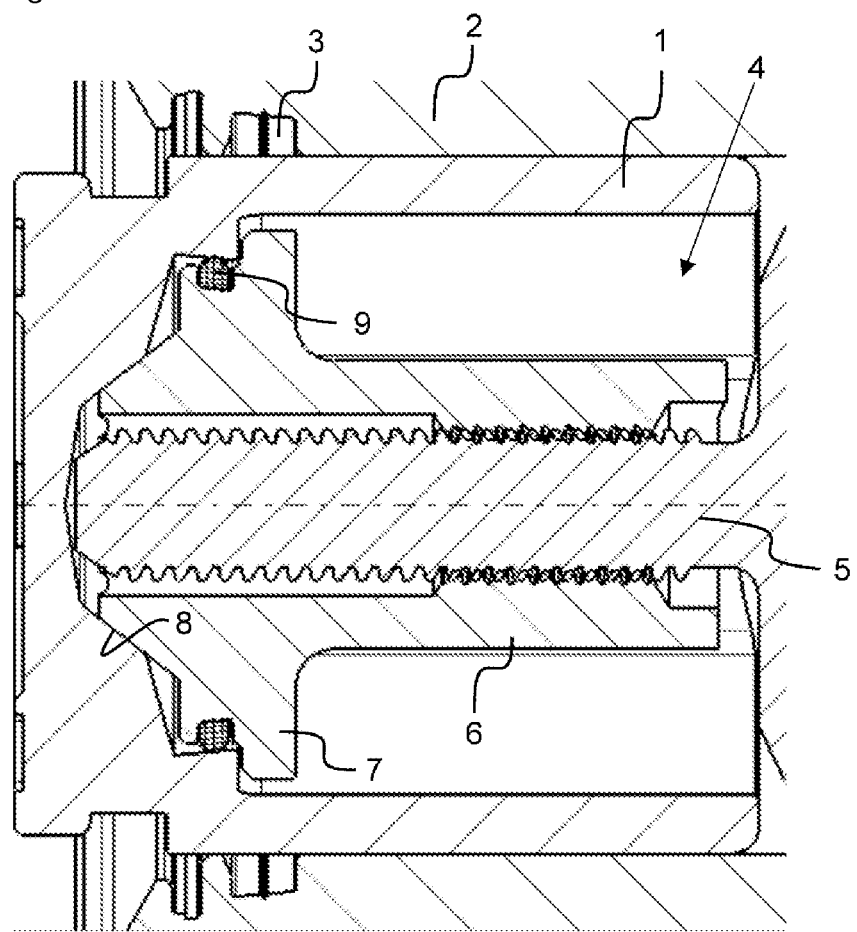
FIGS. 1a to 1c show a brake system according to a first embodiment.

FIG. 1a shows a brake system for a vehicle according to a first embodiment in a cross-sectional view. The brake system comprises a brake piston 1. The brake piston is arranged within a cylinder 2 of a caliper housing. A sealing ring 3 is arranged between the brake piston 1 and the cylinder 2 to provide a seal between a hydraulic chamber 4 arranged within and behind the brake piston and an outside. The hydraulic chamber 4 is in fluid communication with a master cylinder (not shown) via hydraulic lines such that that the hydraulic fluid in the hydraulic chamber 4 may be pressurized for a hydraulic actuation of a braking motion (to the left) of the brake piston 1. When the brake piston 1 performs the brake motion, a brake pad (not shown) connected to a front portion of the brake piston 1 is pushed against a brake disk (not shown) of a wheel to slow down or stop a driving vehicle. To ensure that a parked vehicle remains motionless the driving motion of the brake piston 1 may be actuated using an electro-mechanical parking brake actuator of an electronic parking brake. The electro-mechanical parking brake actuator comprises an electric motor (not shown) attached to the caliper housing (on the right) and a spindle 5. The spindle 5 with splines on an outer surface may be rotated by actuation of the electric motor. A nut 6 having splines on an inner surface is received by the spindle 5. The nut 6 comprises a rotation prevention member 7 formed by ridges on an outer surface of the nut 6. The rotation prevention member 7 of the nut 6 is in engagement with the brake piston 1 to prevent a rotary motion of the nut 6. When the spindle 5 is rotated by the electric motor, the nut 6 performs a translational motion (to the left or right). Upon actuation of the electronic parking brake, the spindle 5 is rotated such that the nut 6 moves to the left. In this case, a front surface 8 of the nut 6 pushes against the brake piston 1 to actuate the braking motion of the brake piston 1 and to thereby activate the parking brake. An elastic member 9 is arranged between nut 6 and the brake piston 1 to couple the motion of the nut 6 and the brake piston 1 in some cases. The elastic member 9 is formed by a shaped ring with an egg-shaped cross section, but it can be an O-Ring in other embodiments. The elastic member 9 may be made of an elastomer, e.g., rubber, in the embodiment shown, but can have a different characteristics in other embodiments, as discussed below.

Figure 1B:
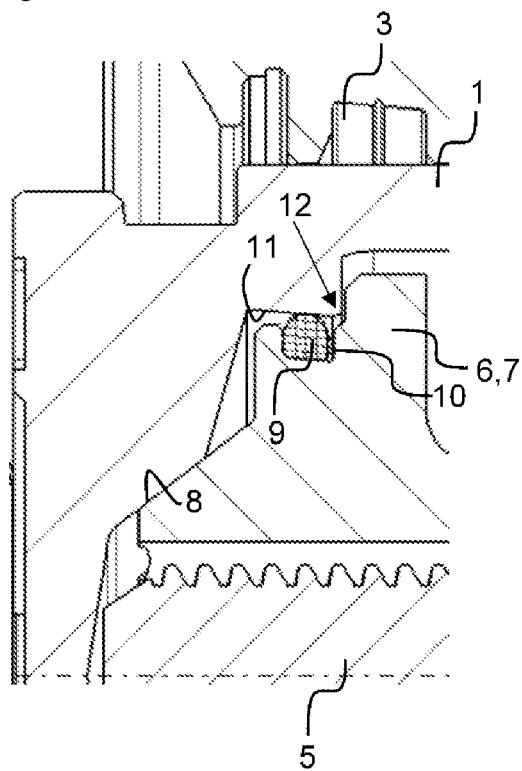
Figure 1C:
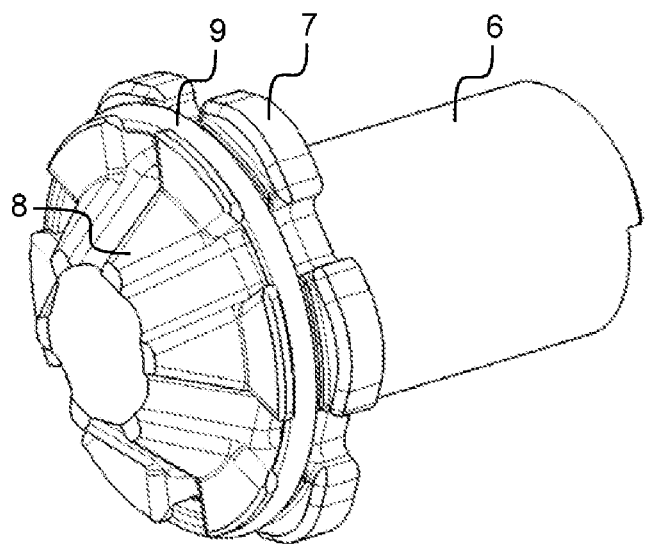

FIG. 1b shows a detailed view of the coupling between the nut 6 and the brake piston 1. Corresponding and reoccurring features shown in the different figures are denoted using the same reference numerals. The coupling comprises an angled snap out mechanism with clearance. The elastic member 9 is held within a groove 10 of the nut 6 and contacts an inner surface 11 of the brake piston 1. The inner surface 11 of the brake piston 1 is tapered such that it has a wider inner diameter on the side facing the brake pad (left). The elastic member 9 and the inner surface 11 of the brake piston 1 couple the nut 6 and the brake piston 1 such that the brake piston 1 is retracted upon movement of the nut 6 to the right upon release of the electronic parking brake, i.e., when electric motor is actuated such that the spindle 5 rotates in a direction that leads to a retraction of the nut 6. Further, the coupling between the nut 6 and the brake piston 1 is such that the brake piston 1 can move to the left to perform the braking motion when the hydraulic brake is actuated. In this case, the nut 6 and spindle 5 may be motionless. Further, when the hydraulic actuation of the hydraulic brake is released, the elastic member 9 and the inclined inner surface 11 couple the nut 6 and brake piston 1 such that the brake piston 1 is retracted (pushed/pulled to the right) by the elastic member 9. The brake piston 1 further comprises an edge 12 formed next to the inner surface 11. The edge 12 defines a decoupling point. Upon rotation of the spindle 5 by the electric motor such that the nut 6 is retracted to the right further than normally done to release the electronic parking brake, the coupling between the nut 6 and the brake piston 1 may be released for exchanging the brake pad, because the elastic member 9 slides to the right beyond the edge 12 of the brake piston 1. Upon subsequent actuation of the parking brake such that the nut moves to the right, the nut 6 may re-engage with the piston 1 such that the elastic member 9 is again in contact with the inclined inner surface 11 of the brake piston 1. A perspective view of the nut 6 and the elastic member 9 is shown in FIG. 1c.

The brake system uses the nut 6 retraction while releasing the parking brake or the hydraulic brake to pull the brake piston from brake disk. The nut 6 is coupled the brake piston 1 by an elastic member 9, which allows disengagement when hydraulic pressure requires the brake piston 1 to move forward upon actuation of the hydraulic brake. The elastic member 9 further allows for movement of the brake piston 1 by a clearance, when only small movements are required. The elastic member 9 further supports a retracting effect of the sealing ring 3 and enables additional retraction. The elastic member 9 further enables active retraction until a disengagement force is reached. The elastic member also enables re-engagement when the electronic parking brake is applied.

Figure 2A:
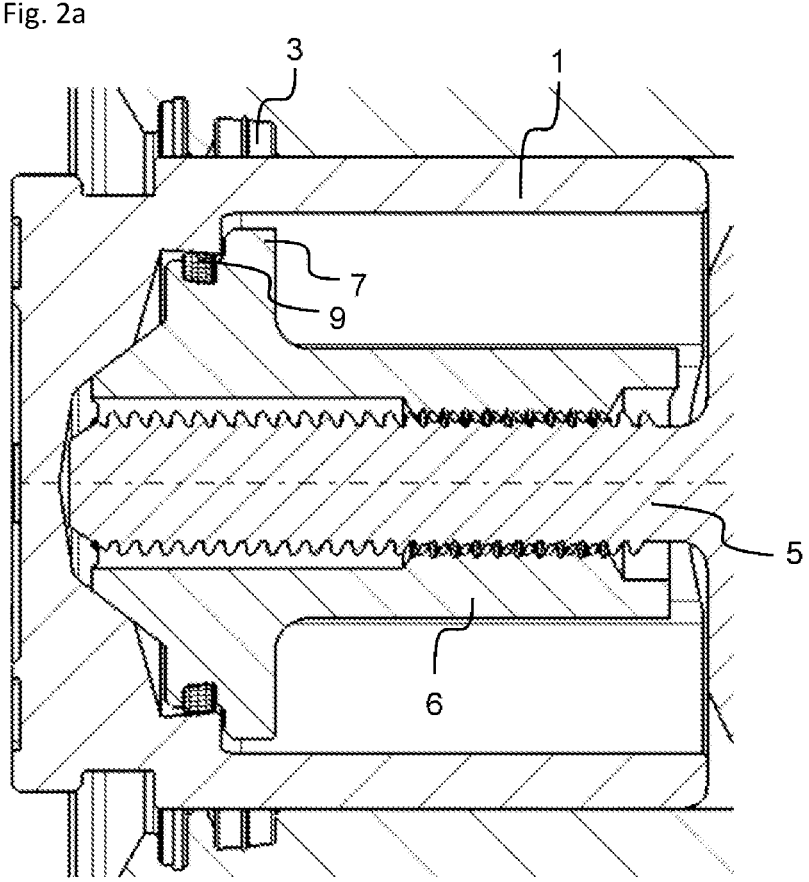
FIGS. 2a to 2c show a brake system according to a second embodiment.
Figure 2B:
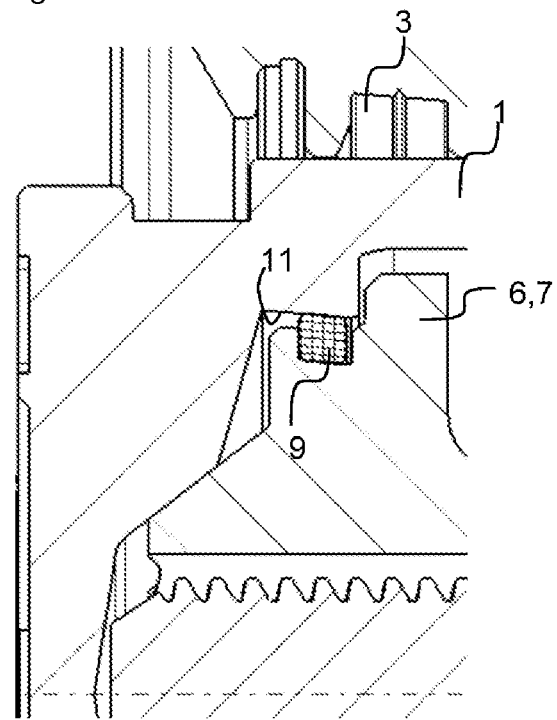
Figure 2C:
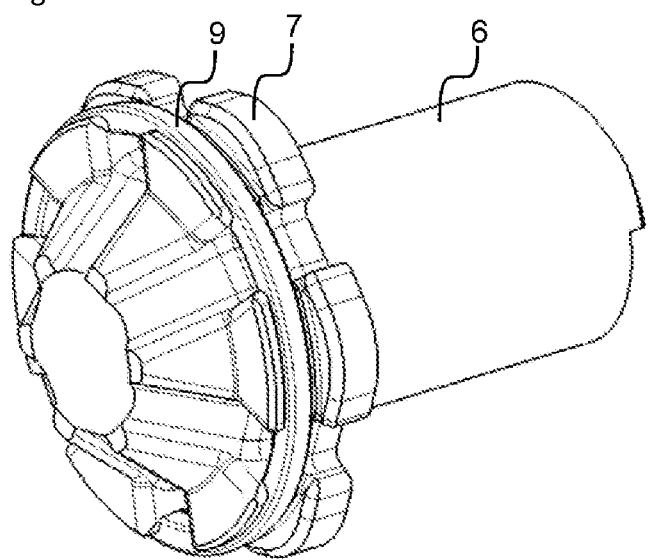
Figure 3A:
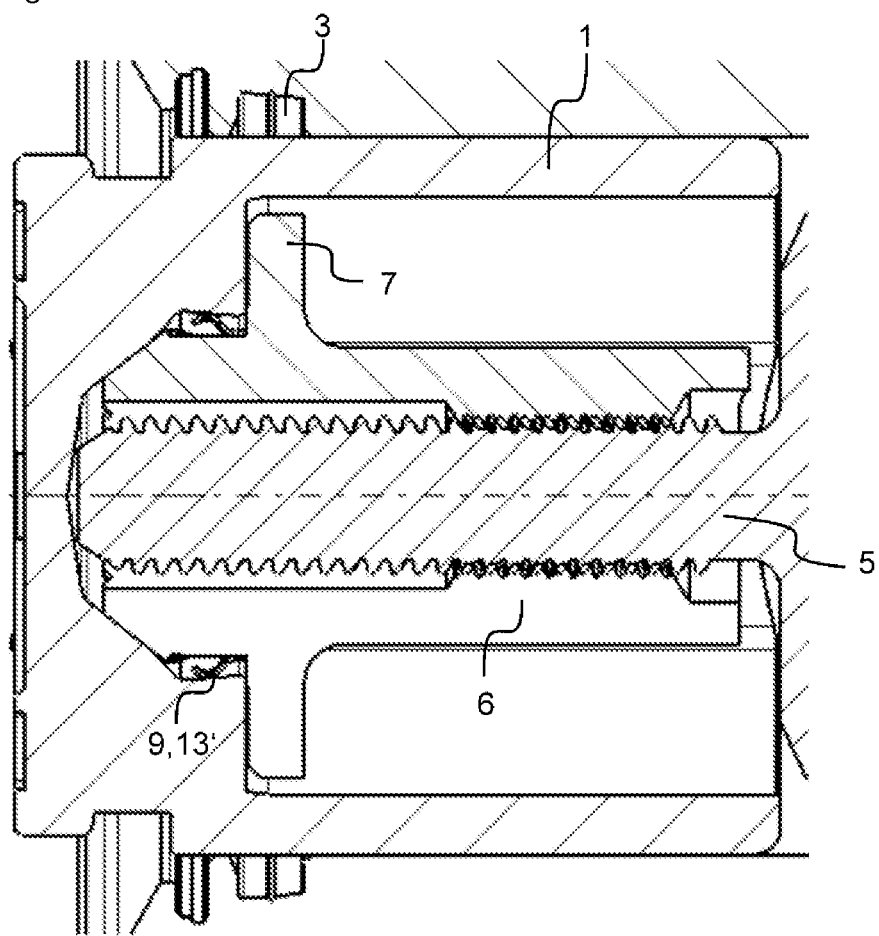
FIGS. 3a to 3c show a brake system according to a third embodiment.
Figure 3B:
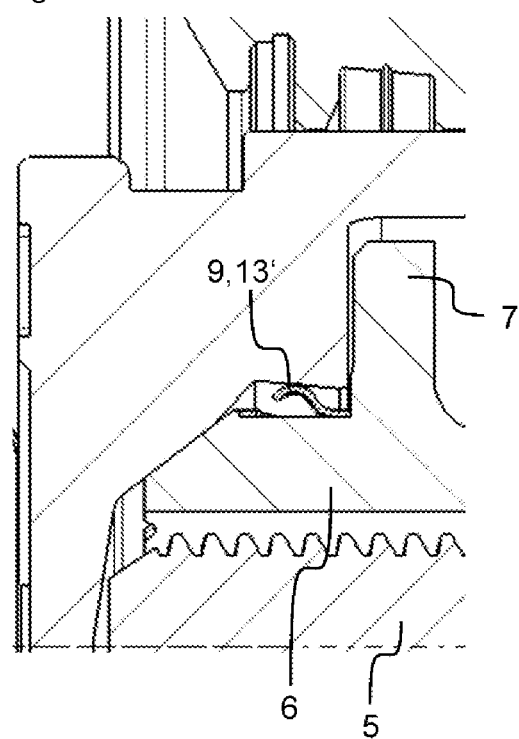
Figure 3C:
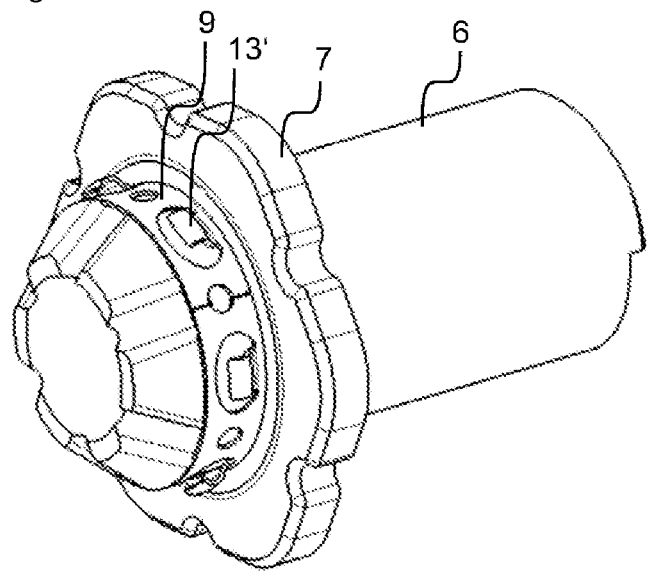
Figure 4A:
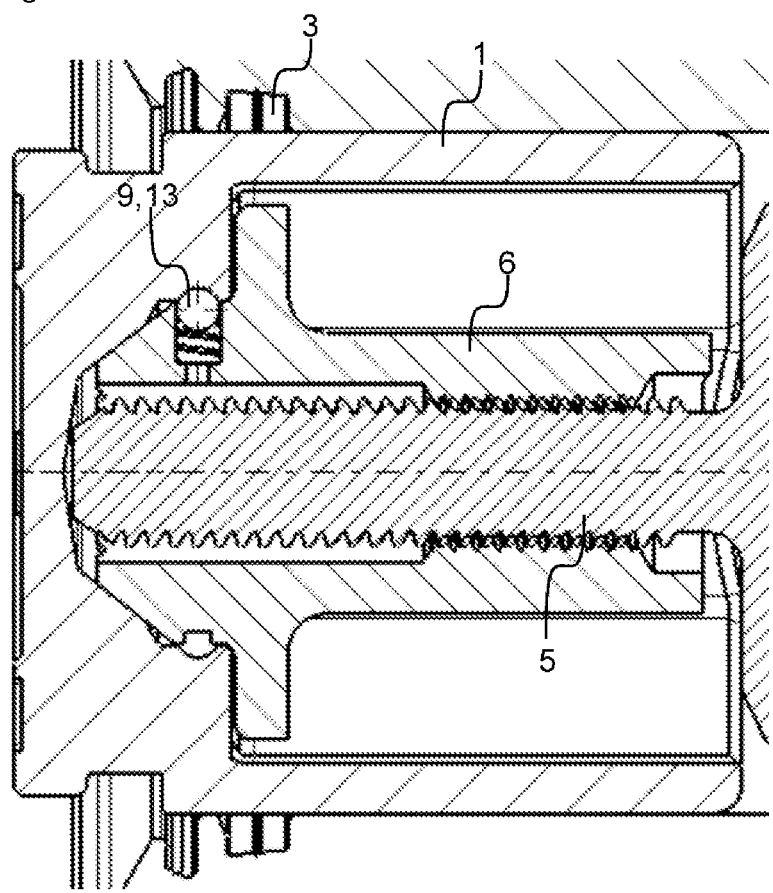
FIGS. 4a to 4c show a brake system according to a fourth embodiment.
Figure 4B:
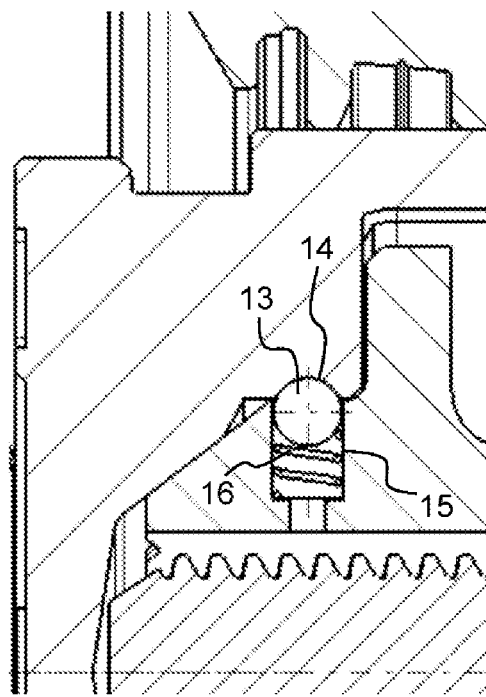
Figure 4C:
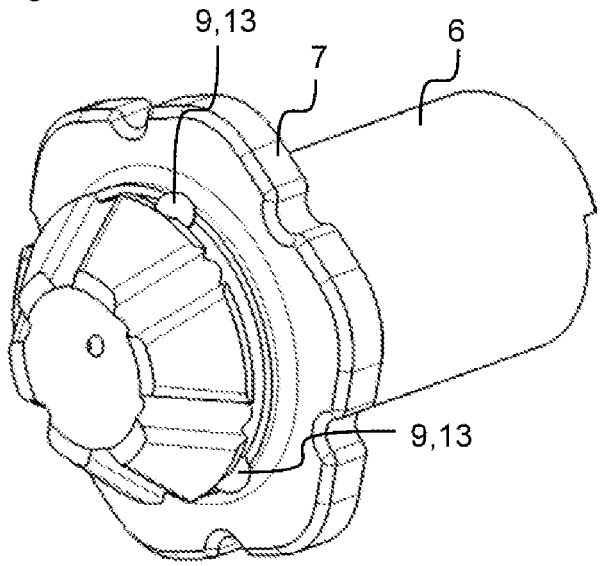
Figure 5A:
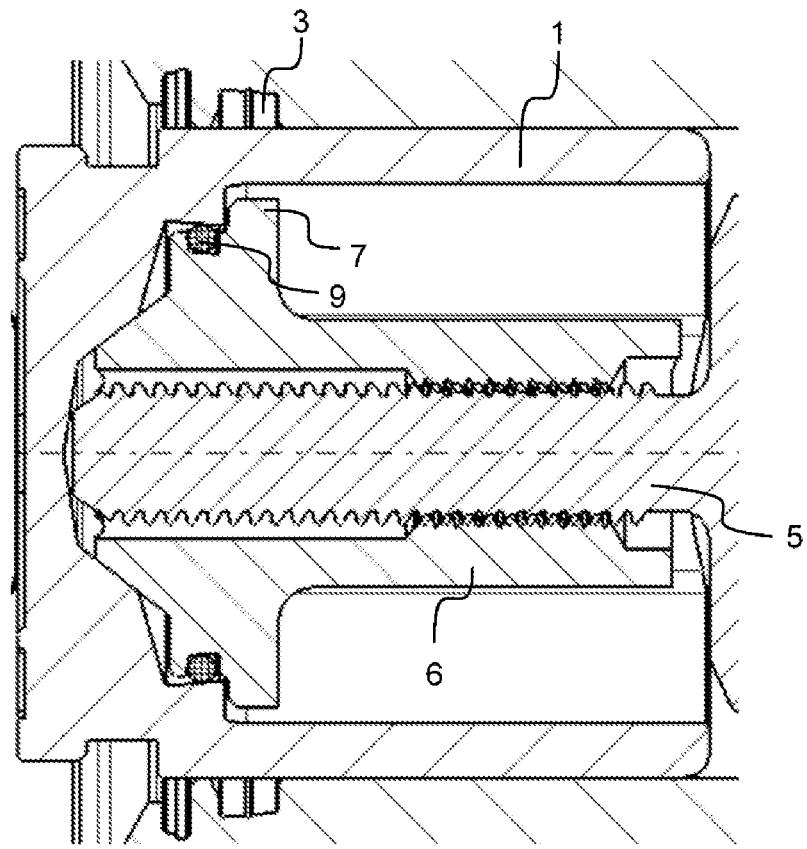
FIGS. 5a to 5d show a brake system according to a fifth embodiment.
Figure 5B:
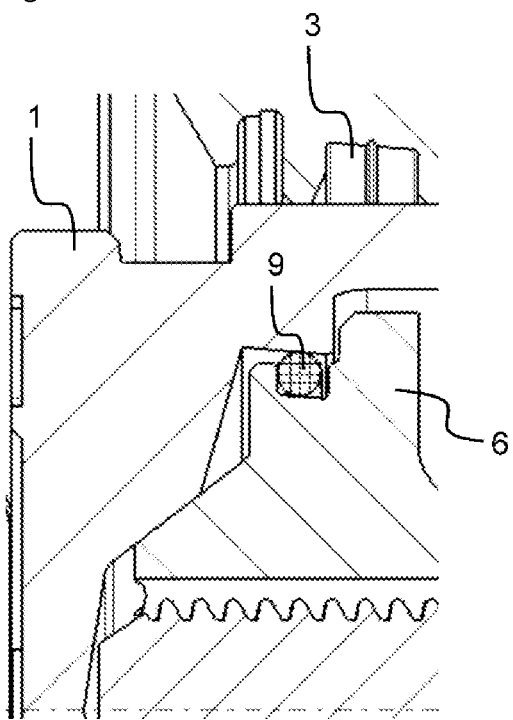
Figure 5C:
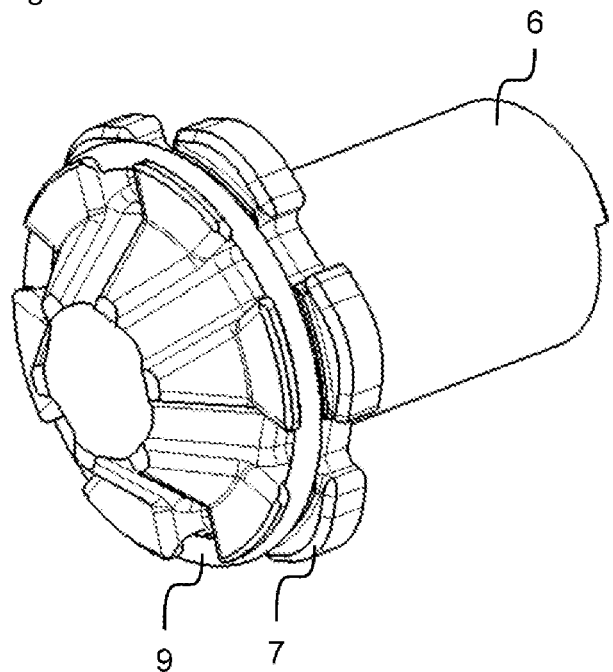
Figure 5D:
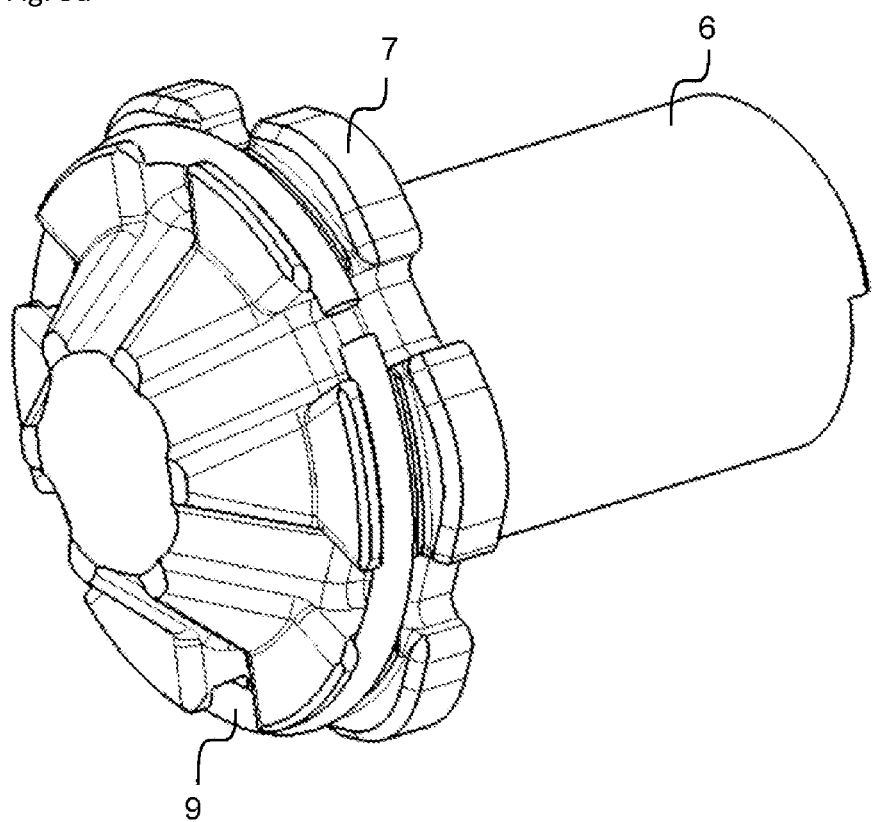

FIGS. 2a to 2c show another embodiment the elastic member 9 of the brake system. In this embodiment, the elastic member 9 is formed by a rubber quad ring, which has a square-shaped cross-section. FIGS. 3a to 3c show another embodiment the elastic member 9 of the brake system. In this embodiment, the elastic member 9 is formed by a metallic multi-spring ring having multiple leaf spring members 13' arranged equidistantly around a circumference of the elastic member. FIGS. 4a to 4c show another embodiment the elastic member 9 of the brake system. According to this embodiment, the elastic member 9 comprises multiple spring-loaded balls 13 that are received within a recess 14, e.g., a groove, formed on the inner surface of the brake piston 1. The spring-loaded balls 13 are held within a bore 15 formed as a through hole within the nut 6. The spring-loaded balls 13 are each supported by a spring 16 received within a broader section of the bore 15. FIGS. 5a to 5d show another embodiment the elastic member 9 of the brake system. According to this embodiment, the elastic member 9 is formed as a metallic spring ring with a round cross section. As shown in FIG. 5d, the elastic member 9 may be formed as a slotted ring that comprises an opening in one annular section. In this manner, a suitable elasticity of the elastic member 9 may be achieved. Further, by providing the opening, the elastic member 9 enables fluid to pass in the longitudinal direction to enable reliable evacuation of air bubbles and pressure compensation of the brake fluid.

Figure 6A:
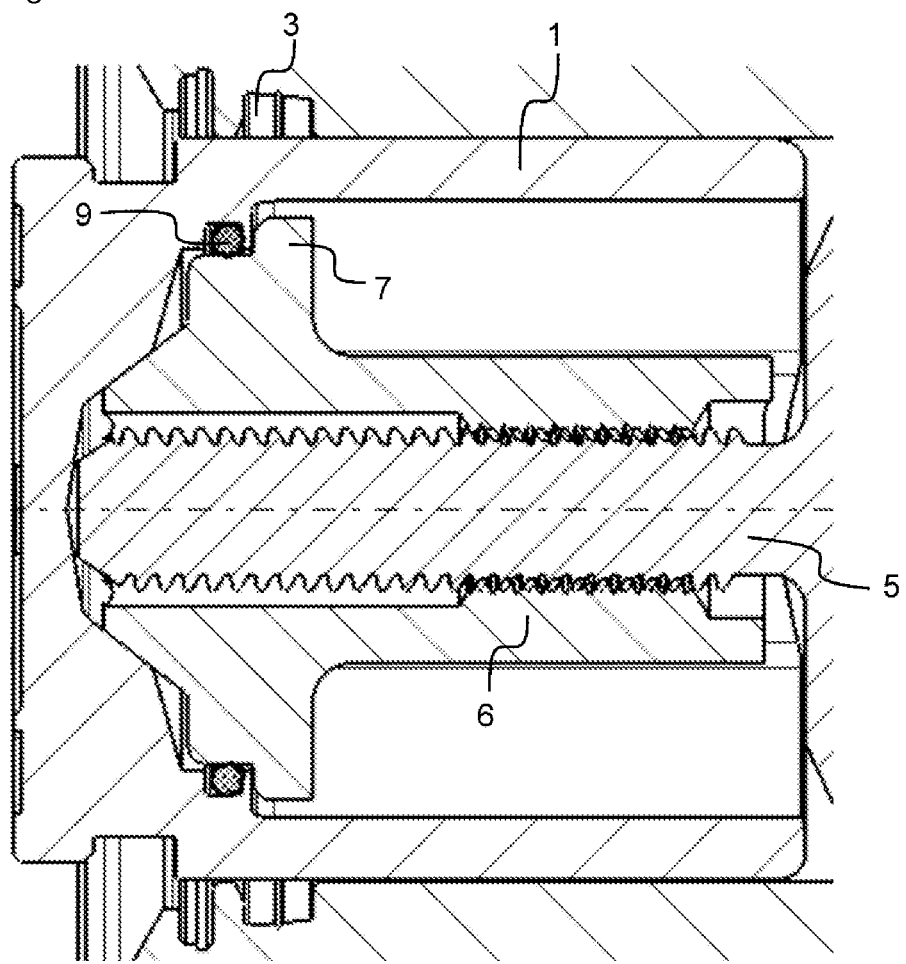
FIGS. 6a to 6c show a brake system according to a sixth embodiment.
Figure 6B:
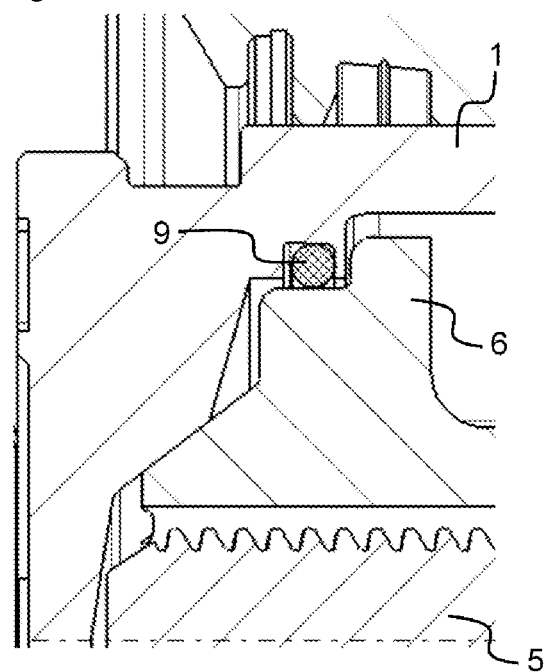
Figure 6C:
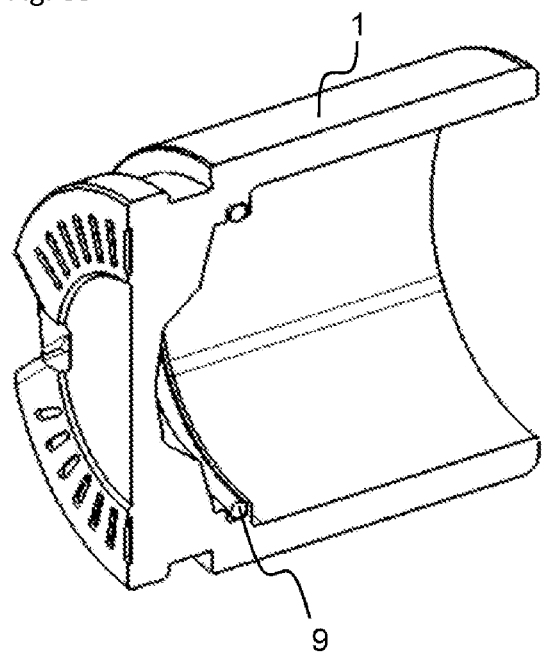

FIGS. 6a to 6c depict another embodiment of the brake system. In this embodiment, the elastic member 9 is fixed to an inner surface of the brake piston 1. The elastic member 9 is arranged within a groove in the inner surface of the brake piston 1 and contacts an outer surface of the nut 6. The functionality is as described above or below for the case of the elastic member 9 being attached to the nut 6. FIG. 6c shows a perspective illustration of a part of the brake piston 1, illustrating the position of the elastic member 9 within the groove in the inner surface of the brake piston 1.

Figure 7A:
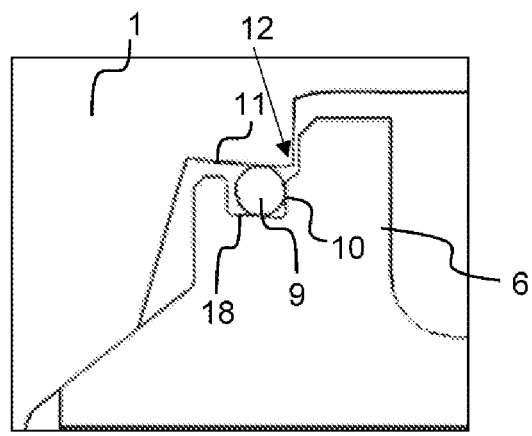
Figure 7B:
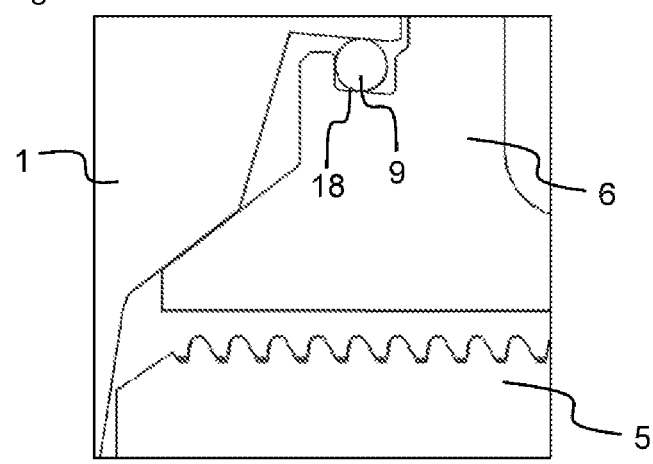
Figure 7C:
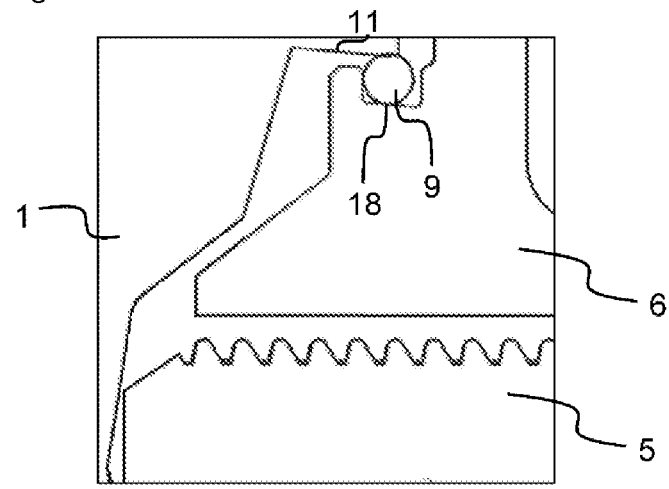

FIGS. 7a to 7d depict the brake system in more detail. As shown, the elastic member 9 is held within the groove 10 formed in the nut 6. The groove 10 has an inclined bottom surface 18, which is in contact with the elastic member 9. The inclination of the bottom surface 18 is such that it is tapered toward the right. The elastic member 9 is held between the inclined bottom surface 18 of the groove 10 and the inclined inner surface 11 of the brake piston 1. In the situation depicted in FIG. 7a, the parking brake and the hydraulic brake are applied and the elastic member 9 arranged in a right (deeper) portion of the groove 10. As shown in FIG. 7b, when the parking brake is switched off, the nut 6 moves toward the right away from the brake piston 1. As a consequence, the elastic member 9 moves toward a left (shallower) portion of the groove 10, and there is essentially no impact on the brake piston 1 until the elastic member 9 reaches a left end of the groove 10. As shown in FIG. 7c, when the hydraulic pressure is released shortly after the parking brake is switched off, the elastic member 9 is squeezed between the inclined surface 11 of the brake piston 1 and the bottom surface 18 of the groove 10. Hereby, the nut 6 pulls the brake piston 1 to the right to support retraction of the brake piston 1. In addition, due to the retracting force generated by the sealing ring 3, the brake piston 1 moves further to the right. Under pure hydraulic action, the elastic member is located in a right end of the groove 10, as shown in FIG. 7d, here the elastic member 9 does not disturb the retracting force generated by the sealing ring 3.

Features of the different embodiments which are merely disclosed in the exemplary embodiments may be combined with one another and may also be claimed individually.

LIST OF REFERENCE NUMERALS 1 brake piston
2 cylinder
3 sealing ring
4 hydraulic chamber
5 spindle
6 nut
7 rotation prevention member
8 front surface of nut
9 elastic member
10 groove of nut
11 inner surface of brake piston
12 edge
13' leaf spring members
13 spring-loaded balls
14 recess
15 bore
16 spring
17 spring members
18 bottom surface of groove

What is claimed is:

1. A brake system for a vehicle, comprising:
a brake piston connectable to a brake pad and configured for performing a braking motion to press the brake pad against a friction surface, wherein the braking motion is actuatable by hydraulic actuation,
an electro-mechanical parking brake actuator configured for actuating the braking motion of the brake piston,
the electro-mechanical parking brake actuator comprising:
a spindle, which is rotatable by an electric motor,
and a nut received on the spindle such that a rotational motion of the spindle leads to a translational motion of the nut,
wherein the nut is coupled with the brake piston such that a translational motion of the nut toward the brake piston actuates the braking motion of the brake piston,
wherein the brake system further comprises an elastic member coupling the brake piston with the nut,
wherein the elastic member is configured to drive a motion of the brake piston in a direction opposite the direction of the braking motion of the brake piston,
wherein the elastic member is configured to decouple the nut from the brake piston upon retraction of the nut beyond a decoupling point,
wherein the elastic member is held within a groove with a bottom surface and contacts an inclined inner surface of the brake piston,
wherein the inclined inner surface of the brake piston is tapered such that it has a wider inner diameter on the side facing the brake pad,
wherein the decoupling point is formed by an edge projecting inwards from the inner circumferential surface of the brake piston,
wherein the nut comprises a rotation prevention member formed by a ridge of the nut,
wherein the rotation prevention member is arranged further from the brake pad than the elastic member, and
wherein the rotation prevention member is arranged further from the brake pad than the edge of the brake piston when the nut is coupled to the brake piston.

2. The brake system of claim 1, characterized in that the elastic member is configured to drive the motion of the brake piston such that the brake piston is retracted upon movement of the nut in a direction opposite the braking motion of the brake piston.

3. The brake system of claim 1, characterized in that the elastic member is configured to drive the motion of the brake piston such that the brake piston is retracted upon release of the hydraulic actuation of the braking motion of the brake piston.

4. The brake system of claim 1, characterized in that the elastic member is fixed to the nut or to the brake piston.

5. The brake system of claim 1, characterized in that the elastic member contacts an inclined inner surface of the brake piston and/or an inclined outer surface of the nut.

6. The brake system of claim 1, wherein the bottom surface is inclined.

7. The brake system of claim 1, characterized in that the elastic member comprises a spring-loaded ball that is configured to be held by a recess.

8. The brake system of claim 1, characterized in that the nut comprises an end portion in a region closest to the brake pad, wherein the elastic member is arranged in the end portion of the nut.

9. The brake system of claim 1, characterized in that the elastic member is ring-shaped.

10. The brake system of claim 1, characterized in that the elastic member is made of or contains an elastomer.

11. The brake system of claim 1, characterized in that the elastic member is made of or contains a metal.

12. The brake system of claim 1, characterized in that the elastic member is a metallic multi-spring ring.

* * * * *